Oct. 26, 1954  C. C. WALLACE  2,692,907
STORAGE BATTERY SEAL
Filed Dec. 27, 1952

INVENTOR.
CURTIS C. WALLACE
BY
ATTORNEYS

Patented Oct. 26, 1954

2,692,907

UNITED STATES PATENT OFFICE 2,692,907

STORAGE BATTERY SEAL

Curtis C. Wallace, Philadelphia, Pa., assignor to The Electric Storage Battery Company, a corporation of New Jersey Application December 27, 1952, Serial No. 328,167

9 Claims. (Cl. 136—170)

This invention relates to storage batteries and to methods of manufacture thereof and has for an object the provision of an improved sealing structure and of a new method of forming said structure between the cover and walls of a container in which the plates of the battery are enclosed.

The customary method of manufacturing a battery is to provide for each cell an assembly of plates and separators within a compartment of a jar, the number of cells depending upon the desired voltage rating of the battery. In many commercial batteries the plate and separator assemblies are suported from posts which are mechanically carried by the cover, the periphery of the cover resting upon a ledge formed about the vertical walls of the jar. In other batteries the covers abut the jar walls and the weight of the plate assembly is supported on plate rests or vertical ribs extending across the bottom of each cell. Regardless of the particular construction, a fluid-tight seal must be provided between the cover and the walls of each cell. Conventionally, this seal has been made by pouring into a trough or sealing groove about the periphery of the covers a substantial amount of hot sealing compound which has the property of forming a fluid-tight connection between the cover and the cell walls. However, because of the fluidity of the hot sealing compound, there is a tendency for the compound to run down through any crevices between the covers and the walls into the cell to the detriment thereof. In addition there are occasions when the temperature of the battery may rise to such a degree as to soften the sealing compound sufficiently for flow into the battery to the detriment thereof and, in some cases, even destroying the seal between the cover and the side walls, thereby permitting the egress of acid and corrosive vapor.

In accordance with the present invention, there is avoided both the loss of sealing compound and run downs thereof either during assembly of the battery or in subsequent use notwithstanding high temperatures to which the battery may ordinarily be subjected.

In carrying out the invention in one form, there is placed onto and thoroughly covering the opening or dividing line between the cover and the walls of the battery casing a material which, while being applied thereto, is in a plastic state. This material may be any one of a group whose hardening temperature is below the pour temperature of the asphaltic sealing compound. Such material must also be non-soluble in the storage battery electrolyte, be possessed of substantially nil flow characteristics, and contain a minimum of water and other volatiles. The material in the plastic state is extruded onto and completely over the dividing line between the cover and the walls of the compartment thereby forming a dam over the dividing line or crevice which effectively prevents the run-down of sealing compounds subsequently poured into the sealing groove. Upon application of the hot sealing compound the heat thereof is utilized to harden the plastic material. Throughout the life of the battery there remains an effective and impenetrable dam provided to prevent run-downs of sealing compound into the battery and to preclude the possible emission of corrosive vapors therefrom.

For further objects and advantages of the invention and for examples of suitable plastic compounds, reference may be had to the following description taken in conjunction with the accompanying drawings, in which.

Figure 1:
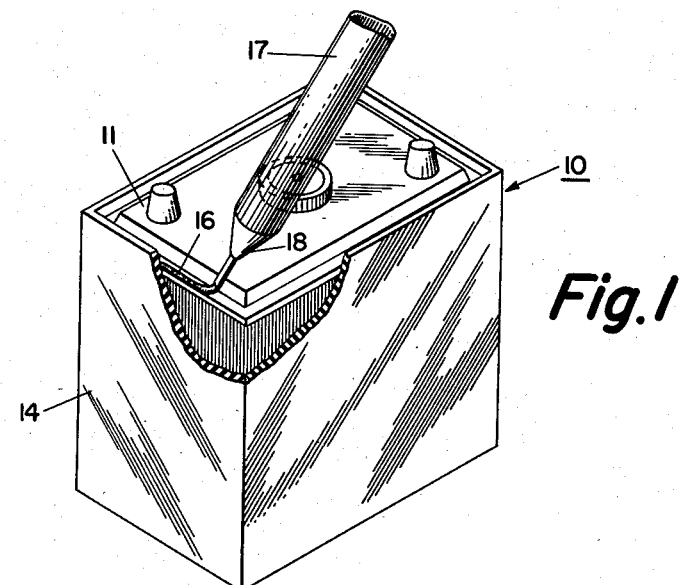
Fig. 1 is a perspective view of one cell of a battery with the wall portion cut away to show one step in the process.
Figure 2:
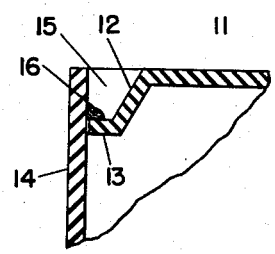
Fig. 2 is an enlarged fractional sectional view of the plastic material after extrusion onto the dividing line between the cover and side wall.

Referring now to the drawings, wherein like reference numerals designate like parts throughout the several views, a cell 10 of a storage battery is illustrated, with some of the parts omitted for clarity. There is accurately depicted a typical cover 11 which may have a downwardly disposed angular section 12 about the periphery thereof terminating in an outwardly extended flanged portion 13. The downwardly extending portion 12 provides together with an adjacent side wall 14 of the cell a trough or sealing groove 15 for the reception of a quantity of sealing compound to prevent egress from the battery of acid or corrosive vapors. Between the extending flange 13 of the cover and the inner surface of wall 14 there may be, due to molding tolerances, a certain amount of clearance space which may in some instances be ⅛" or even larger, and which may be referred to as a parting line or opening. If hot sealing compound is poured into the sealing trough 15, it will be understood that some of it may leak through the parting line or space. This leakage is undesirable both from the standpoint of loss of compound and degradation of the battery. In the past it has been necessary to provide packing in the opening to prevent leakage, but the methods used increased the cost of manufacture and the resultant packing and seal have not been entirely satisfactory during subsequent battery usage.

In accordance with the present invention, a plastic material 16 such as a vinyl plastisol, i. e., a dispersion of vinyl resin in a plasticizer, which is possessed of excellent flow characteristics under elevated pressures but whose flow characteristics may be considered substantially nil when pressures are removed is preferably used as a damming material. The term "vinyl resin" is deemed to refer to those thermoplastic synthetic resins having the structure $CH_2=CH-$ and any products resulting from a polymerization or co-polymerization thereof. The material 16 may be extruded by any suitable means, such as indicated by an extruding head 17, into the trough 15 and over the groove or parting line between the cover and the side wall of the cell 10. The extruding means may preferably have an extruding head similar to those of conventional caulking guns in which the guiding end comprises a small cylinder 18, an end of which may be brought into close proximity with the crevice or parting line, thus to insure the proper bridging of the crevice or parting line with a minimum of material. Because of the flow characteristic of the preferred material 16 there will be no run-down of the material into the battery cell to the detriment thereof. After the plastic material is extruded into and over the parting line, hot sealing compound 19 is poured from any convenient dispenser such as a ladle 20 into the sealing trough 15. The temperature of the hot asphaltic sealing compound 19 is of the order of 375–425° F., higher than the hardening temperature of the selected material 16. For example, vinyl plastisol has a hardening temperature of 300–350° F., usually 325° F.

Figure 3:
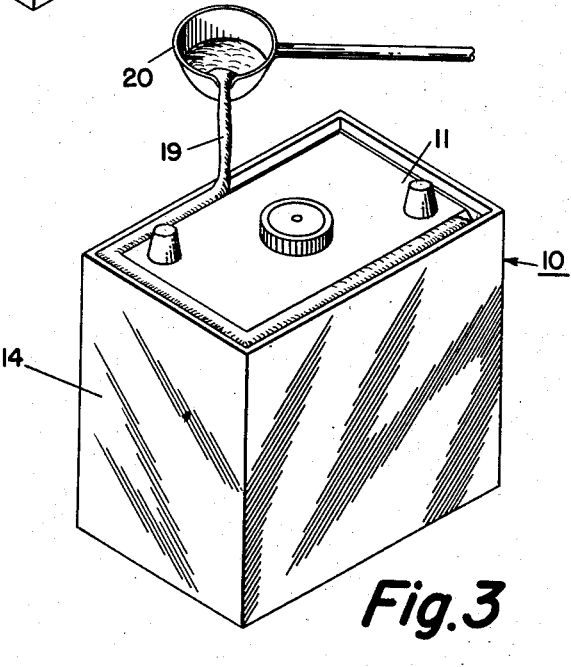
Fig. 3 is a perspective view of an addition of asphaltic sealing compound into the sealing groove.
Figure 4:
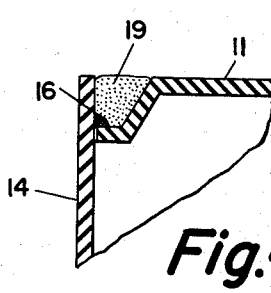
Fig. 4 is an enlarged fractional sectional view showing the sealing groove after completion of the sealing operations.

The trough 15 holds an adequate quantity of the hot compound to raise the temperature of the plastic material 16 to or above its hardening temperature. However, it will be understood that it is not necessary that the entire mass of plastic material 16 be hardened and that it is sufficient if only the surface of the material shall be hardened adequately to form a semi-rigid support between the cover 11 and the walls 14. Thus, in the assembly of storage batteries it is only necessary to follow the steps outlined above, and the sealing compound 19 as shown in Fig. 3 will provide heat necessary to harden the material 16. During subsequent use of the battery and regardless of the temperature up to about 325° F. to which the sealing compound 19 and the material 16 are subjected, the opening or parting line between the cover and the case will at all times be sealed and there will be avoided any loss of sealing compound into the interior of the battery or an escape of acid or corrosive vapor therefrom.

While a typical example of a heat hardenable material has been given, it is to be understood others may be utilized it only being necessary that such material be inert to and insoluble in the electrolyte, possess nil flow characteristics under ordinary pressure, contain a minimum of volatiles, and harden with the application of heat.

The plastic material in order to possess proper characteristics of flow may include additives, for example, fillers such as talc, barium sulphate and colloidal silica, and plasticizers such as dioctyl phthalate and dibutyl phthalate. Of course, other fillers and plasticizers may be used and they will be selected in view of the plastic materials used. There may be several suitable fillers and plasticizers for a single selected plastic material. The plasticizer need be present only in an amount sufficient to provide for proper flow characteristics of the plastic compound during extrusion thereof over a crevice or parting line since flow of the material is undesirable once it has been extruded. An example of a satisfactory composition includes equal parts by weight of vinyl chloride, talc and dioctyl phthalate.

Obviously, many modifications and variations of the present invention are possible in the light of the above teachings without departing from the spirit or scope of the invention as defined by the appended claims.

What is claimed is:

1. The method of sealing a storage battery which comprises applying at the juncture of the cover and the walls of a battery container a heat hardenable material, and applying hot sealing compound to raise the temperature of the heat hardenable material to a point not lower than that required to harden it in situ.

2. The method of sealing a storage battery which comprises applying at the juncture of the cover and the walls of a battery container a heat hardenable compound comprising a plastic, a plasticizer and a filler, and applying hot sealing compound to raise the temperature of the extruded compound to a point not lower than that required to harden it in situ.

3. The method of sealing a storage battery which comprises extruding at the juncture of the cover and the walls of a battery container a plastisol, and applying hot sealing compound to raise the temperature of the extruded plastisol to a point not lower than that required to harden it in situ.

4. The method of providing a seal between the cover and side walls of a storage battery which comprises applying a heat hardenable material over the juncture of said cover and walls to form a dam completely covering said juncture, and hardening said material in situ by applying hot sealing compound thereto.

5. The method of sealing a storage battery which comprises extruding at the juncture of the cover and the wall of a battery container a plastisol comprising a vinyl resin, a filler selected from the group consisting of talc, barium sulphate and colloidal silica, and a plasticizer selected from the group consisting of dioctyl phthalate and dibutyl phthalate, and applying hot sealing compound to raise the temperature of the extruded plastisol to a point not lower than the hardening temperature thereof.

6. A battery including a cover and walls forming cells thereof characterized by a dam between the cover and adjacent walls comprising a heat hardenable thermoplastic material applied by extrusion and hardened in situ, and a layer of sealing compound over-laying said dam.

7. A battery including a cover and walls forming cells thereof characterized by a dam between the cover and adjacent walls comprising a vinyl plastisol applied by extrusion and hardened in situ, and a layer of sealing compound overlaying said dam.

8. A battery having at least one cell provided with a cover, said battery being characterized by a dam comprising a vinyl resin, a plasticizer, and a filler over the juncture of said cover and walls, and a layer of sealing compound poured over said dam for hardening said dam in situ and effecting a seal between the cover and walls of said battery to prevent the escape of corrosive materials from the confines thereof.

9. A battery including walls forming cells thereof and a cover, said cover provided with an angularly depending portion terminating in a flange which cooperates with the walls of said casing to form a trough, a dam consisting of a vinyl resin, a plasticizer, and a filler in said trough and over the juncture of said cover and walls, and a layer of asphaltic sealing compound filling the remainder of said trough and applied thereto in a molten state whereby said dam is hardened to provide between said cover and walls a rigid seal effective under all conditions of operation of said battery.

References Cited in the file of this patent

UNITED STATES PATENTS

| Number | Name | Date |
|---|---|---|
| 1,127,936 | Snyder | Feb. 9, 1915 |
| 1,508,847 | Gillette | Sept. 16, 1924 |
| 2,388,042 | Daily | Oct. 30, 1945 |
| 2,603,671 | Burns et al. | July 15, 1952 |